United States Patent
Wu

(10) Patent No.: US 7,104,135 B2
(45) Date of Patent: Sep. 12, 2006

(54) OPTICAL PRESSURE-SENSING SYSTEM AND METHOD FOR SENSING PRESSURE

(75) Inventor: Jeah Sheng Wu, Hsinchu (CN)

(73) Assignee: Industrial Technology Research Institute, Hsinchu (TW)

( * ) Notice: Subject to any disclaimer, the term of this patent is extended or adjusted under 35 U.S.C. 154(b) by 26 days.

(21) Appl. No.: 11/026,099

(22) Filed: Jan. 3, 2005

(65) Prior Publication Data

US 2006/0144150 A1     Jul. 6, 2006

(51) Int. Cl.
  *G01L 9/00*     (2006.01)
(52) U.S. Cl. ..................... 73/705; 250/231.19
(58) Field of Classification Search ............. 73/705
  See application file for complete search history.

(56) References Cited

U.S. PATENT DOCUMENTS

| | | |
|---|---|---|
| 4,270,091 A | 5/1981 | Mann |
| 4,933,545 A | 6/1990 | Saaski et al. |
| 5,908,988 A | 6/1999 | Lee et al. |

OTHER PUBLICATIONS

Hecht, Eugene; Optics; 1998; Addison-Wesley; Third Edition; pp. 362-363.*

* cited by examiner

*Primary Examiner*—Edward Lefkowitz
*Assistant Examiner*—Lori Moorman
(74) *Attorney, Agent, or Firm*—Volentine, Francos & Whitt, PLLC

(57) ABSTRACT

The optical pressure-sensing system essentially comprises a light source, a resonant cavity and a detector, where the light source is used for generating a light with a predetermined wavelength, the resonant cavity includes a stationary wall with a stationary plane and a movable wall with a movable plane, and the detector is used for detecting a resonated light generated in the resonant cavity by resonating the light between the stationary plane and the movable plane. According to the present invention, a first light is generated and resonated in a resonant cavity to amplify the interaction between the first light and gas molecules in the resonated cavity. The interaction is measured, and the pressure in the resonant cavity is calculated based on the interaction. The interaction between the light and gas molecules in the resonant cavity may change the polarization angle or the phase of the light.

15 Claims, 2 Drawing Sheets

OPTICAL PRESSURE-SENSING SYSTEM AND METHOD FOR SENSING PRESSURE

BACKGROUND OF THE INVENTION (A) Field of the Invention

The present invention relates to an optical pressure-sensing system and a method for sensing pressure, and more particularly, to an optical pressure-sensing system using an optical resonant cavity and a method for sensing pressure.

(B) Description of the Related Art

Many physical properties such as thermal conductivity, frictional resistance and ionization effect of gases in a chamber are properly used to measure the pressure as shown in the prior skills. U.S. Pat. No. 4,270,091 discloses a method for measuring the density of residual gases in a chamber, and more specifically, teaches exciting gases in the chamber by an electron beam, wherein the gases can generate de-excitation radiation which is proportional to the density of the excited gases in the chamber, i.e., proportional to the concentration of the residual gases in the chamber. U.S. Pat. No. 5,908,988 discloses an optical vacuum pressure gauge capable of measuring pressure between 760 to 0.1 torr. Since the reflective index of gases inside a cavity varies with pressure therein, and the reflective index can be estimated based on the phase difference between a p-polarized light and s-polarized light due to the total-internal-reflection in the cavity, the pressure or vacuum degree in the cavity can be measured from the estimated reflective index.

SUMMARY OF THE INVENTION

The objective of the present invention is to provide an optical pressure-sensing system using an optical resonant cavity and a method for sensing pressure.

In order to achieve the above-mentioned objective and avoid the problems of the prior skills, the present invention provides an optical pressure-sensing system using an optical resonant cavity and method for sensing pressure. The optical pressure-sensing system comprises a light source, a resonant cavity and a detector, where the light source is used for generating a light with a predetermined wavelength, the resonant cavity includes a stationary wall with a stationary plane and a movable wall with a movable plane, and the detector is used for detecting a resonated light generated in the resonant cavity by resonating the light between the stationary plane and the movable plane. According to the present invention, the light is generated by the light source and resonated in the resonant cavity to amplify the interaction between the light and gas molecules in the resonated cavity. The interaction is measured, and the pressure in the resonant cavity is determined based on the interaction. The interaction between the light and gas molecules in the resonant cavity may change the polarization angle or the phase retardation of the light. In addition to measuring the pressure in the resonant cavity, the present invention can measure the vacuum of the resonant cavity also.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
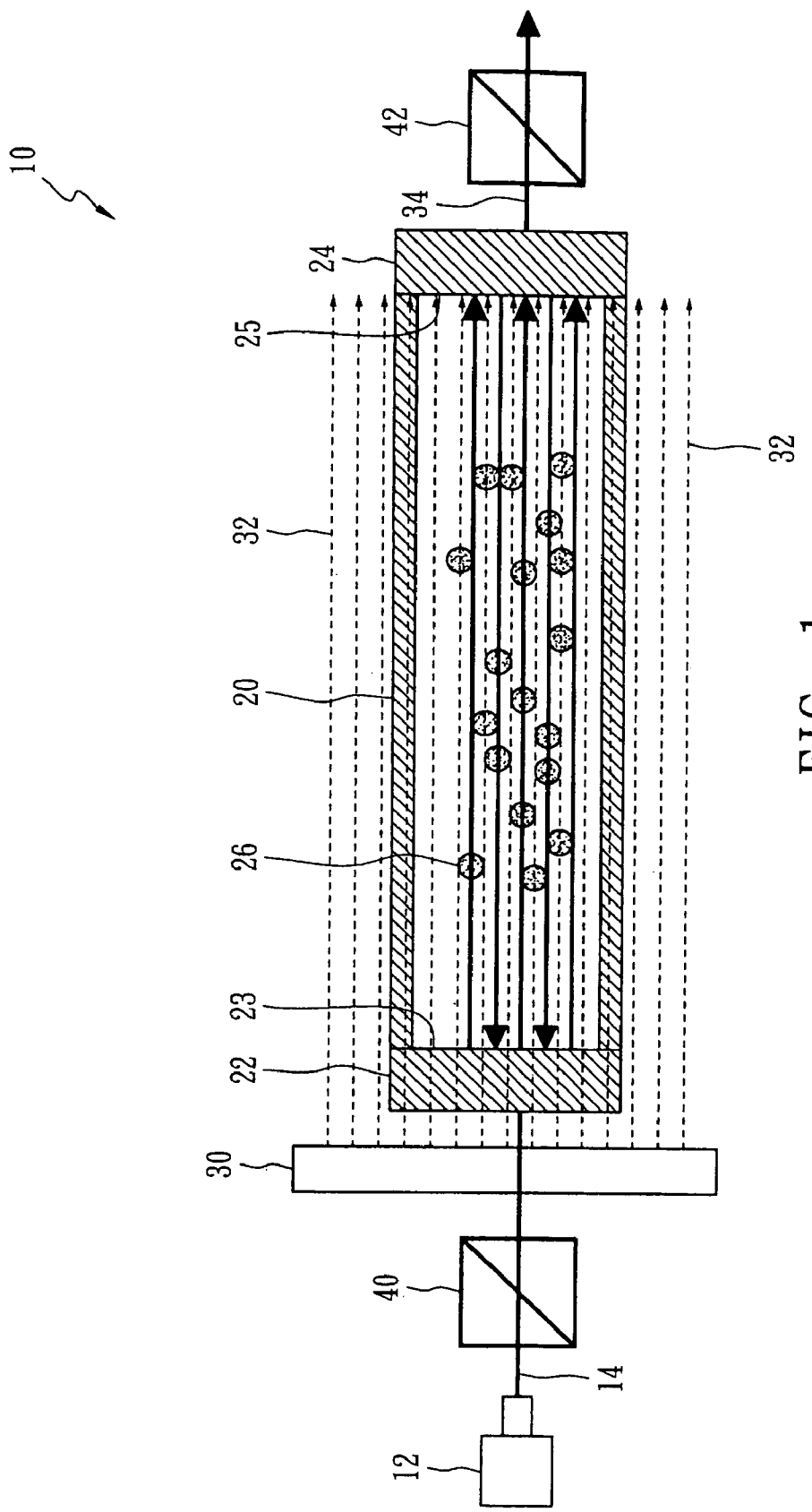
FIG. 1 is a schematic diagram of an optical pressure-sensing system according to the first embodiment of the present invention.

FIG. 1 is a schematic diagram of an optical pressure-sensing system 10 according to the first embodiment of the present invention. The optical pressure-sensing system 10 comprises a light source 12 such as a laser generator for generating a light (laser) 14 with a predetermined wavelength, a resonant cavity 20, a first polarizer 40 positioned between the light source 12 and the resonant cavity 20, and a second polarizer 42 for measuring the polarization angle of a resonated light 34 generated in the resonant cavity 20 by resonating the light 14 between the stationary plane 23 on a plate 22 and the movable plane 25 on a plate 24. Preferably, the optical pressure-sensing system 10 can further comprise a magnetic field generator 30 for generating a magnetic field 32 in the resonant cavity 20. In addition, the magnetic field generator 30 can be replaced by an electric field to generate an electric field in the resonant cavity 20.

The light 14 has a first polarization angle $\phi_1$ when passing through the first polarizer 40 and resonates between the stationary plane 23 and the movable plane 25 when entering the resonates cavity 20, and the resonated light 34 has a second polarization angle $\phi_2$ when leaving the resonated cavity 20. In other words, the interaction between the light 14 and gas molecules 26 in the resonant cavity 20 transforms the light 14 with the first polarization angle $\phi_1$ into the resonated light 34 with second polarization angle $\phi_2$. The difference between $\phi_1$ and $\phi_2$ varies with the applied magnetic field 32 and gas molecules 26 in the resonant cavity 20, wherein the variation of the polarization angle is realized as Faraday rotation effect described as follow:

$$\Delta\phi = \phi_1 - \phi_2$$

$$C_v = \Delta\phi / Bl$$

Where $C_v$ represents Verdet constant, B represents the magnitude of the magnetic field 32, and l represents the effective length of the magnetic field 32. Verdet constant $C_v$ is correlated with the pressure in the resonant cavity 20. Under a pressure of 1.0 atm, $C_v$ for a light with a wavelength 633 nm is $1.5 \times 10^{-3}$ Rad/T m. Consider a magnetic field of 0.1 T with an effective length 0.1 m, the angle difference $\Delta\phi$ was measured to $1.5 \times 10^{-5}$ Rad, which can be amplified to $3.0 \times 10^{-2}$ Rad/Tm after resonating for 1000 cycles in the resonant cavity 20. Consequently, $\Delta\phi$ can be measured from the outputs of the first polarizer 40 and the second polarizer 42, $C_v$ can then be calculated from $\Delta\phi$ and the applied magnetic field 32, and the pressure in the resonant cavity 20 can be determined based on the calculated Verdet constant ($C_v$). In addition to the Faraday rotation effect, birefrangence, Cotton-Mouton effect can also be used to calculate the pressure in the resonant cavity 20.

Figure 2:
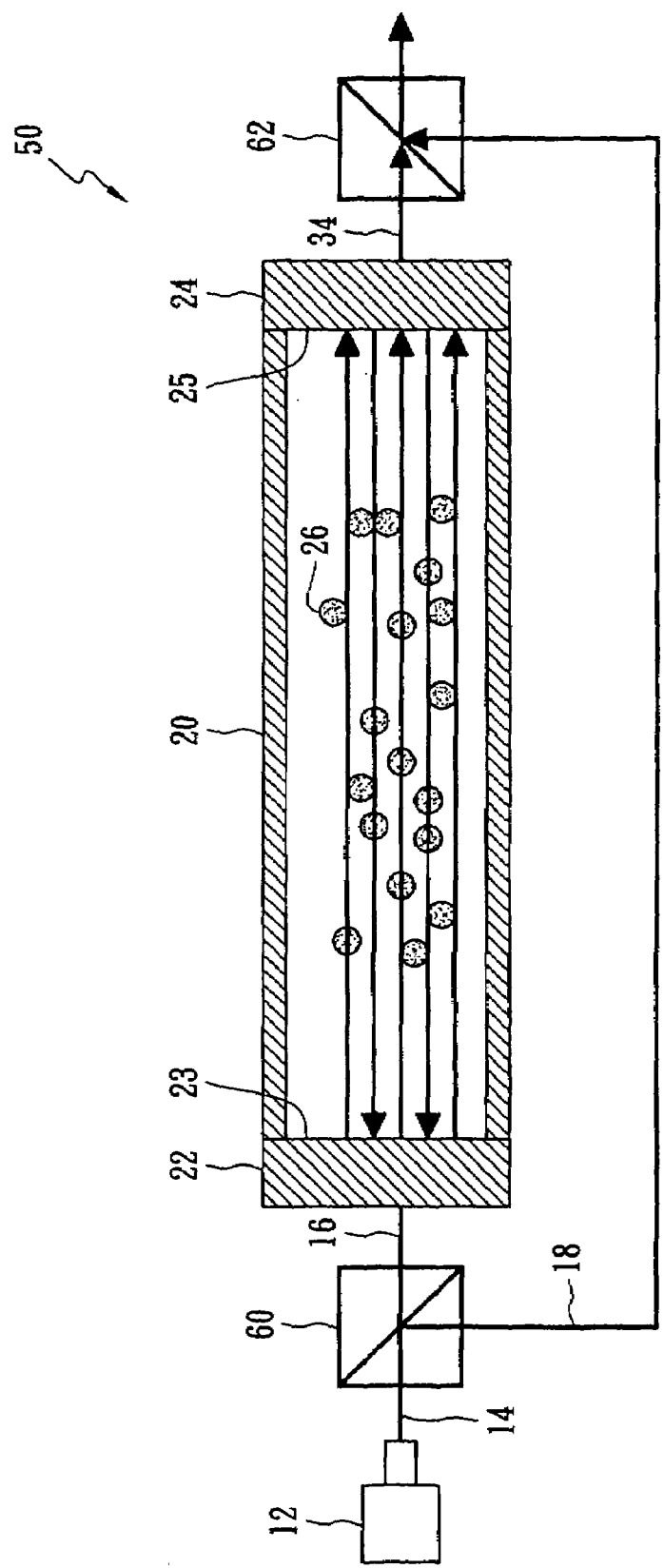
FIG. 2 is a schematic diagram of an optical pressure-sensing system according to the second embodiment of the present invention.

FIG. 2 is a schematic diagram of an optical pressure-sensing system 50 according to the second embodiment of the present invention. Compared with the optical pressure-sensing system 10 shown in FIG. 1, the optical pressure-sensing system 50 uses a first splitter 60 and a second splitter 62 instead of the first polarizer 40 and the second polarizer 42. The light 14 is divided into a detection light 16 and a reference light 18, wherein the detection light 16 enters the resonant cavity 20 and the reference light 18 bypasses the resonant cavity 20. The detection light 16 resonates between the stationary plane 23 and the movable plane 25 to generate the resonated light 34, and the interaction between the detection light 16 and gas molecules 26 in the resonant cavity 20 transforms the detection light 16 with a first phase into the resonated light 34 with a second phase. The second splitter 62 measures the phase difference between the resonated light 34 and the reference light 18, and the phase difference is correlated to the number (N) of gas molecules 26 in the resonant cavity 20. Consequently, the pressure in the resonant cavity 20 with a predetermined volume (V) under a certain temperature (T) can be calculated from the number of gas molecules in the resonant cavity 20 in the light of the idea gas equation, i.e., P=NkT/V.

The above-described embodiments of the present invention are intended to be illustrative only. Numerous alternative embodiments may be devised by those skilled in the art without departing from the scope of the following claims.

What is claimed is:

1. An optical pressure-sensing system, comprising:
   a light source for generating a light with a predetermined wavelength;
   a resonant cavity comprising two planes for generating a resonated light by resonating the light between the two planes;
   a first polarizer positioned between the light source and the resonant cavity; and
   a second polarizer for measuring the polarization angle of the resonated light wherein the measured polarization angle is used to calculate the pressure inside the cavity.

2. The optical pressure-sensing system of claim 1, further comprising a magnetic field generator for applying a magnetic filed to the resonant cavity.

3. The optical pressure-sensing system of claim 1, further comprising an electric filed generator for applying an electric filed to the resonant cavity.

4. A method for sensing pressure, comprising
   generating a first light of a given wavelength;
   resonating the first light in a resonant cavity having two reflective planes to amplify the interaction between the first light and gas molecules in the resonant cavity to generate a resonated light;
   detecting the interaction after the resonated light penetrates one of the two reflective planes; and
   calculating the pressure in the resonant cavity based on the interaction.

5. The method for sensing pressure of claim 4, wherein the first light is a polarized light with a first polarization angle.

6. The method for sensing pressure of claim 5, wherein the interaction between the first light and gas molecules in the resonant cavity transforms the first light with the first polarization angle into the resonated light with a second polarization angle.

7. The method for sensing pressure of claim 6, wherein the detecting the interaction includes measuring the difference between the first polarization angle and the second polarization angle.

8. The method for sensing pressure of claim 7, wherein the calculating the pressure in the resonant cavity based on the interaction comprises:
   calculating the density of gas molecules in the resonant cavity based on the difference between the first polarization angle and the second polarization angle; and
   calculating the pressure in the resonant cavity based on the density of gas molecules in the resonant cavity.

9. The method for sensing pressure of claim 4, wherein the generating a first light comprises:
   generating an original light; and
   splitting the original light into the first light and a second light, wherein the first light enters the resonant cavity and the second light bypasses the resonant cavity.

10. The method for sensing pressure of claim 4, wherein the interaction between the first light and gas molecules in the resonant cavity transforms the first light with a first phase into the resonated light with a second phase.

11. The method of sensing pressure of claim 10, wherein the detecting the interaction includes measuring the phase difference between the first phase and the second phase.

12. The method for sensing pressure of claim 11, wherein the calculating the pressure in the resonant cavity based on the interaction comprises:
   calculating the density of gas molecules in the resonant cavity based on the phase difference; and
   calculating the pressure of the resonant cavity based on the density of gas molecules in the resonant cavity.

13. The method for sensing pressure of claim 4, further comprising applying an electric filed to the resonant cavity.

14. The method for sensing pressure of claim 4, further comprising applying a magnetic filed to the resonant cavity.

15. An optical pressure-sensing system, comprising:
   a light source for generating a light with a predetermined wavelength;
   a resonant cavity comprising two planes for generating a resonated light by resonating the light between the two planes;
   a first splitter positioned between the light source and the resonant cavity; and
   a second splitter for measuring the phase retardation of the resonated light wherein the measured phase retardation is used to calculate the pressure inside the cavity.

* * * * *